Patented May 15, 1951

2,552,654

UNITED STATES PATENT OFFICE 2,552,654

HEAT-RESISTANT CATHODE COATINGS

Henry T. Swanson, Lancaster, Pa., assignor to Radio Corporation of America, a corporation of Delaware No Drawing. Application August 30, 1948, Serial No. 46,921

6 Claims. (Cl. 250—27.5)

The present invention relates to cathode coatings and more particularly to a coating material that is stable in the presence of relatively high temperatures required in the fabrication of electron discharge devices and that is characterized by good adherence in the completed device.

The adherence of coating material on a cathode is of basic importance for good operation of an electron discharge device. Among the factors affecting such adherence, where the coating material is in the form of a carbonate, are wetness of spray, unclean surfaces on the cathode, and faulty spraying. Assuming these factors can be controlled to provide desirable conditions of adherence in the respects mentioned, faulty adherence may result from another cause. In the presence of relatively high sealing temperatures such as are required for sealing hard glass components of a device, the cathode temperature may be raised to a value over 300° C. At this temperature the nitrocellulose, which is usually used as a binding agent for the carbonate coating material, readily decomposes, leaving the carbonate powdery and without binding properties. In addition, the carbonate also begins to decompose at such temperatures, rendering it vulnerable to reaction with moisture.

It is therefore an object of the invention to provide a coating material including a binder that will be resistant to decomposition at relatively high temperatures required for the fabrication of an electron discharge device.

Another object is to provide a carbonate coating composition that will effectively preserve the carbonate from harmful effects during the relatively high temperatures employed in the fabrication of an electron discharge device and until the device is baked.

An additional object is to provide a cathode coating material including a carbonate of an emitting substance and a nitrocellulose binder, in which said binder is protected against appreciable decomposition.

A still further object is to provide an emitting coating material for a cathode containing a plasticizer for preserving the elastic and pliant characteristics of the coating during its state as a carbonate in the presence of relatively high temperatures and for providing an ultimate emitting oxide coating that will be free from peeling during operation.

It is well known that certain materials emit electrons more readily than others when heated in vacuo or in the presence of a gas. Such materials are the oxides of metals such as calcium, strontium, barium and thorium, among others. It is preferable, however, to use the materials in the form of carbonates during the manufacture of an electron discharge device in view of the greater stability of this form of the material in the natural atmosphere. It is common practice to add to the carbonate a suitable nitrocellulose binder which is subsequently driven off during manufacture of the device.

The binder referred to may comprise, for example cellulose nitrate, which is fibrous in structure. So long as the fibers of the binder are kept moist they effectively function as a binder in the coating material. However, when subjected in an atmosphere at least partially consisting of air to temperatures of the order of 300° C. to 400° C. sometimes encountered in making seals in devices in which the coating material is used, the nitrocellulose decomposes and loses its fibrous character with a consequent deterioration in its binding properties.

It may be pointed out that prior practices have recognized the desirability of adding plasticizers to nitrocellulose and other compounds to render them flexible and pliant at normal room temperatures.

Under such conditions of use, the treated compounds are continuously exposed to air so that a natural process of evaporation of the plasticizer is permitted to take place. However, entirely different conditions exist when the plasticizer is added to a cathode coating material and give rise to many problems. One of these problems concerns the relatively high temperatures required in the making of an electron discharge device in which the coating material is used and during which the plasticizer should be pliant. Another problem arises from the fact that the coating material is involved in a manufacturing operation that is relatively rapid and does not afford the required time for natural evaporation of the plasticizer. A further problem involves the tendency of plasticizers to leave a residue after having been heated. In electron discharge devices, such residue is undesirable and may cause defective operation of the device.

Accordingly, it is a further object of the invention to provide a plasticizer for a cathode coating material that will cause the coating to remain pliant during substantially the entire time of manufacture of an electron discharge device but will decompose and evaporate before the manufacture is completed.

Another object is to provide a plasticizer for a cathode coating material that has a critical decomposition character and when included in the coating material in an amount within a range of critical values shows substantially no tendency to leave a residue on the cathode after such decomposition.

A further object is to provide a cathode coating material including a binder and a plasticizer in which the amount of plasticizer is relative to the amount of binder chosen to provide a good coating on the cathode while avoiding an undesirable residue.

According to the invention the intrinsic characteristics of the nitrocellulose binder are preserved by the addition to the coating material of a plasticizer that is chemically inert with respect to the nitrocellulose binder and that serves to maintain the fibers thereof in an elastic and pliable state at the elevated temperatures referred to, thereby delaying decomposition of the nitrocellulose binder. At the same time the plasticizer has no adverse effects on tube performance.

One plasticizer selected for the purposes of the invention is triethylene glycol-di-2-ethylbutyrate, known under the trade designation as "3GH," which has a relatively high boiling point. Many other materials, however, having similar characteristics will serve equally well as a plasticizer in accordance with the invention.

The plasticizer referred to will maintain its protective characteristics during the relatively short, high temperature sealing operations required for the fabrication of an electron discharge device. However, if the relatively high temperatures, for example, between 300° and 400° C. are maintained for an appreciable length of time, the plasticizer will lose its protective property and the nitrocellulose in the coating will decompose and result in a defective coating. But, in tube manufacture these high temperatures used, for example, in sealing envelope elements, are not usually required over periods long enough to evaporate the plasticizer.

The invention therefore provides a novel coating material for application to cathodes, which includes a relatively high boiling point plasticizer for maintaining the fibers of the nitrocellulose binder pliant, to thereby preserve their binding properties in the coating material during manufacture of an electron discharge device.

While prior manufacturing experience has shown a frequent occurrence of peeling of the cathode coating, experiments have demonstrated that by the mere addition of the plasticizer of the invention to a heretofore used coating material, a complete elimination of the peeling hazard has resulted.

The relative amounts of carbonate of an emitting substance and nitrocellulose binder used in cathode coating materials are well known in the art, and consequently need not be described herein.

In carrying out the invention, however, it is necessary that the amount of plasticizer lie between two extremes. Thus, the amount of plasticizer in the coating material should not be less than 1% nor more than 5% by weight of the cellulose nitrate binder. If less than 1% of plasticizer is used, its beneficial effect on the material will be below that required for successful use. If more than 5% of plasticizer is added, it will have an undesirable residue in a device in which this coating is used. While an improved coating will result if the amount of plasticizer lies within the range of 1% to 5% by weight in the binder, it is preferable in accordance with the invention to employ an amount of plasticizer that is about 2% by weight of the binder.

The specific example described for practicing the invention is not to be construed as a limitation thereof but it is desired that the invention be given a scope commensurate with the appended claims.

What I claim is:

1. A cathode coating material, including a binder for causing said material to cohere until sintered to thereby prevent peeling of a coating formed by said material, and means for preserving the effectiveness of said binder in the presence of temperatures up to 400° C. incidental to a sealing step in the manufacture of a device in which the coating material is used, said means comprising a plasticizer included in said material and being from 1 per cent to 5 per cent by weight of said binder.

2. An emitting coating for a cathode comprising a carbonate, a pliant binder for improving adherence of the coating to the cathode, and a plasticizer comprising triethylene glycol-di-2-ethylbutyrate, for preserving the pliant character of said binder after said coating is applied to said cathode in the presence of temperatures up to 400° C., the amount of said plasticizer being small relative to the amount of said binder to prevent an undesired residue.

3. In a cathode coating material including a carbonate of an emitting substance and a nitrocellulose binder decomposing at a temperature above 300° C.: a relatively high boiling point plasticizer for raising the decomposition temperature of said binder to about 400° C., the amount of said plasticizer being about 2% by weight of said binder for preventing an undesirable residue when said binder and plasticizer are decomposed during the manufacture of an electron discharge device using said material.

4. In a cathode coating material including a carbonate of an emitting substance and a nitrocellulose binder decomposing at a temperature above 300° C.: a plasticizer in the amount of from 1% to 5% by weight of said binder for temporarily preserving said binder against decomposition at relatively high temperatures required in the manufacture of an electron discharge device using said material and for preventing an undesirable residue in said device on eventual decomposition of said binder and said plasticizer.

5. An emitting coating material for a cathode having an emitting substance therein to be sintered to a cathode base for adherence thereto, and including a mixture for causing said substance to cohere and adhere to said base after application thereto and prior to sintering thereof, said mixture comprising a binder normally decomposable at temperatures below the temperature required for said sintering, and a plasticizer for raising the decomposition temperature of said binder to said sintering temperature, the amount of said plasticizer being from 1 to 5% by weight of said binder, whereby said material coheres and adheres to said base until the emitting substance therein is sintered to said base.

6. An emitting coating material for a cathode comprising a mixture including a binder decomposable at a temperature of about 300° C. and a plasticizer for raising the decomposition temperature of said mixture to about 400° C., the amount of said plasticizer in said mixture being below 5% by weight of said binder to prevent an undesirable residue on decomposition of said mixture.

HENRY T. SWANSON.

REFERENCES CITED

The following references are of record in the file of this patent:

UNITED STATES PATENTS

| Number | Name | Date |
|---|---|---|
| 1,747,061 | Dushman | Feb. 11, 1930 |
| 1,747,062 | Dushman | Feb. 11, 1930 |
| 1,747,063 | Dushman | Feb. 11, 1930 |
| 1,747,064 | Dushman | Feb. 11, 1930 |
| 1,812,103 | MacRae | June 30, 1931 |
| 1,817,636 | Meyer | Aug. 4, 1931 |
| 1,821,359 | Reerink et al. | Sept. 1, 1931 |
| 1,870,951 | Fredenburgh | Aug. 9, 1932 |
| 1,894,059 | Ruffley | Jan. 10, 1933 |
| 1,974,603 | Giard | Sept. 25, 1934 |
| 2,032,091 | Holt | Feb. 25, 1936 |

OTHER REFERENCES

Arnold: "Phenomena in Oxide-Coated Filament Electron Tubes," in Physical Review, vol. 16, 1920, p. 73.